United States Patent
Appelfeller et al.

(10) Patent No.: US 7,535,615 B2
(45) Date of Patent: May 19, 2009

(54) ELECTROCHROMIC ELEMENT

(75) Inventors: Klaus Appelfeller, Oberweissbach (DE);
Thomas Hoeing, Roding (DE); Franz Jungbauer, Furth Im Wald (DE);
Christian Zilker, Waldmuenchen (DE)

(73) Assignee: Flabeg GmbH & Co. KG, Fuerth (DE)

(*) Notice: Subject to any disclaimer, the term of this patent is extended or adjusted under 35 U.S.C. 154(b) by 0 days.

(21) Appl. No.: 11/427,914

(22) Filed: Jun. 30, 2006

(65) Prior Publication Data

US 2007/0058237 A1 Mar. 15, 2007

(30) Foreign Application Priority Data

Jul. 1, 2005 (EP) ................... 05014323

(51) Int. Cl.
*G02F 1/153* (2006.01)
*G09G 3/19* (2006.01)
*H04N 9/16* (2006.01)

(52) U.S. Cl. .......... 359/267; 345/49; 348/817

(58) Field of Classification Search .......... 359/242, 359/265–275, 277; 250/70; 345/49, 105; 348/817; 438/929
See application file for complete search history.

(56) References Cited

U.S. PATENT DOCUMENTS

| | | |
|---|---|---|
| 5,011,582 A | 4/1991 | Oshikawa et al. |
| 2003/0137712 A1* | 7/2003 | Westfall et al. .......... 359/256 |

FOREIGN PATENT DOCUMENTS

| | | |
|---|---|---|
| DE | 30 08 768 A1 | 9/1981 |
| DE | 37 36 076 A1 | 5/1989 |
| GB | 2 295 241 A | 5/1996 |

* cited by examiner

*Primary Examiner*—Scott J Sugarman
*Assistant Examiner*—Dawayne A Pinkney
(74) *Attorney, Agent, or Firm*—Darby & Darby

(57) ABSTRACT

An electrochromic element includes a transparent carrier on which a multilayer system is disposed, the multilayer system including an ion storage layer, a transparent solid-state electrolyte layer), an electrochromic electrode layer, and a reflector layer. The reflector layer has a porosity which is sufficient for the penetration of water or water vapour.

3 Claims, 1 Drawing Sheet

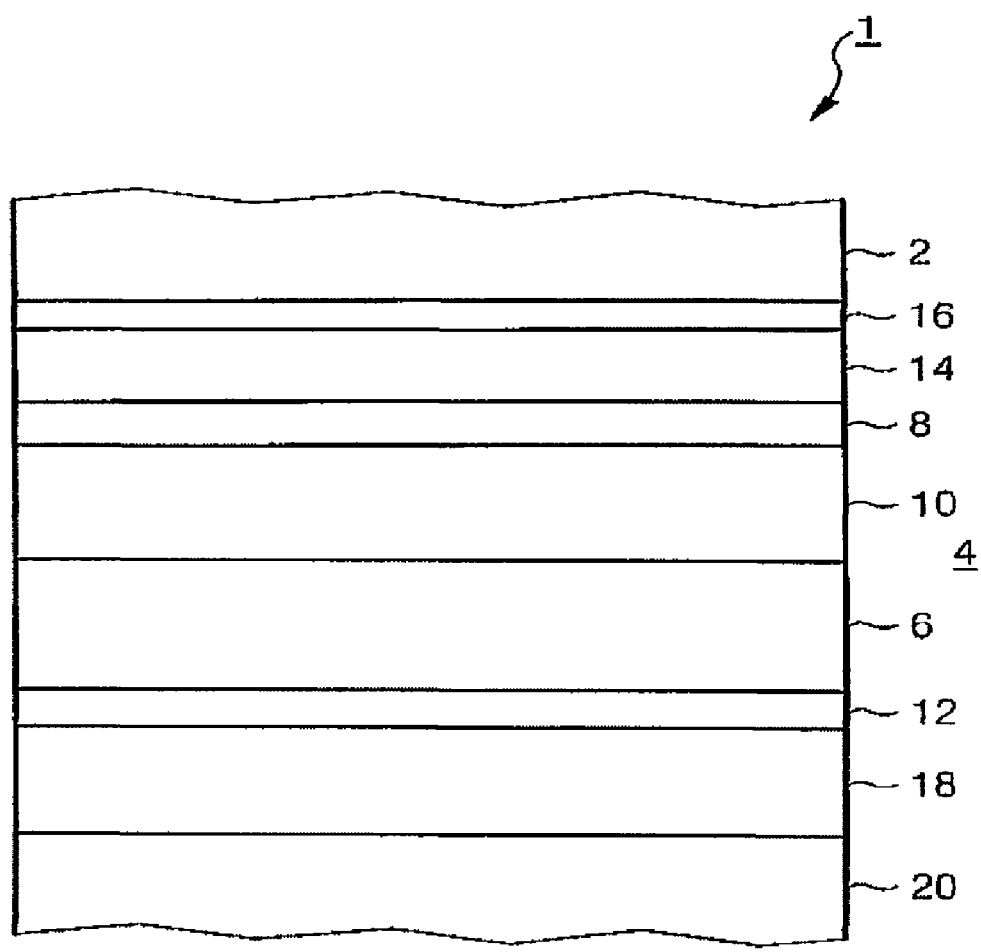

ELECTROCHROMIC ELEMENT

Priority is claimed to European Patent Application No. EP 05 014 323.9-2205, filed on Jul. 1, 2005.

The invention relates to an electrochromic element with a transparent carrier on which a multilayer system is applied, the multilayer system comprising an ion storage layer, a transparent solid-state electrolyte layer, an electrochromic electrode layer, and a reflector layer. It relates, furthermore, to a motor-vehicle mirror including such an electrochromic element, as well as to a method for manufacturing such an electrochromic element.

BACKGROUND

The phenomenon of an electrochemically induced spectroscopic change in a material, usually a change of color, is usually called electrochromism. Taking advantage of this phenomenon, it is possible to manufacture, for example, optical devices with variable transmission or reflection, in which the degree of reflection or transmission can be changed as a function of an applied voltage.

In such electrochromic elements, an electrochromic material with guest ions or electrons, fed into the electrochromic material by applying an electric potential, interacts, their interaction being influenced by incident electromagnetic radiation. Typical examples of such electrochromic materials are $WO_3$ and $MoO_3$, which, when applied in thin layers on a carrier, are almost colorless. If protons penetrate into such a layer, for example in the case of tungsten oxide ($WO_3$), a reduction to blue tungsten bronze will take place, the intensity of the coloring being determined by the charge quantity that has flown in the layer.

Electrochromic elements manufactured on the basis of this principle can be used in different devices in which a purposeful variability of the reflection or transmission properties is desirable. Such devices can be used, for example, in windows and canopy tops, in particular for motor vehicles. Such applications are, however, particularly advantageous in the manufacture of antidazzle rear-view mirrors for motor vehicles, because it is one problem of such rear-view mirrors, which for good recognizability in daylight are usually designed for a particularly high reflectance, that at night, they can be very disturbing, in particular with regard to a possible dazzlement through following vehicles. Therefore, concerning the spectral distribution of the light emitted by the headlamps of motor vehicles, an efficient antidazzle behavior can be achieved in a particularly favorable way through suitable variation of the reflection properties of a rear-view mirror by coating such a mirror with a suitably chosen electrochromic material. On the one hand, in daylight, a particularly high reflectance can be maintained, and if required, i.e. for example after a sensorily detected incidence of light at night, the spectral reflection properties can purposefully be modified by applying a control voltage, thus achieving an antidazzle effect.

Especially in view of a possible use in rear-view mirrors of motor vehicles, it is desirable that such electrochromic elements achieve, with relatively short switching times, a particularly high so-called reflection stroke, namely the difference between the reflection maximum and the reflection minimum. In this way, the reduction of the dazzling effect which can be achieved by applying the control voltage, will be particularly high. Furthermore, electrochromic elements suitable for use in rear-view mirrors of motor vehicles should in general be designed for a particularly long service life, in view of the global service time and the number of switching cycles.

These requirements are fulfilled to a particularly high degree by an electrochromic element in so-called solid-state construction which is known, for example, from DE 196 40 515 A1. In this electrochromic element, a multilayer system is applied on a transparent carrier, for example on a glass substrate. The multilayer system comprises an ion storage layer applied directly onto the substrate, on which a transparent solid-state electrolyte layer is applied. On the latter, in turn, an electrochromic electrode layer is applied, which is covered by a reflector layer. Through this construction, in particular a high reliability and service-life stability can be achieved, which is required especially for applications in the field of motor vehicles. To guarantee at the same time also a marked antidazzle effect, a high reflection stroke is desirable especially for this type of electrochromic elements.

SUMMARY OF THE INVENTION

An object of the present invention is to provide an electrochromic element of the above-mentioned type, with which a particularly large reflection stroke can be achieved. A further or alternate object of the present invention of to provide a method for manufacturing such an electrochromic element.

Regarding the electrochromic element, the above-mentioned task is solved according to the invention by the fact that the reflector layer possesses a porosity which is sufficient for the penetration of water or water vapour.

For the known electrochromic element, a particularly high homogeneity and purity of the individual layers is desired, as is generally usual for multilayer systems manufactured by thin-film technology, in particular in order to guarantee a particularly long service life under reproducible manufacturing conditions. Surprisingly, it turned out, however, that clearly improved working parameters, in particular more favorable service times and a clearly reinforced reflection stroke, can be achieved for the electrochromic element by manufacturing the reflector layer arranged on the electrochromic electrode layer with supposedly actually deteriorated layer parameters. Accepting a slightly lower total reflectance, the achievable reflection stroke can considerably be increased, as compared with the densest possible layers, by a specific adjustment of a certain porosity in the reflector layer, because the adjustment of a porosity enabling the almost unhindered penetration of water or water vapour through the reflector layer guarantees that the layer system situated under the reflector layer can be supplied in a relatively simple and reliable way and over a large surface with the working medium necessary for the course of the electrochromic process, namely water. Furthermore, the deposition of a relatively porous reflector layer makes it possible to manufacture the layer under production conditions which are relatively gentle for the layers lying under it, whereby a quality deterioration of the layers already deposited, in particular of the electrochromic electrode layer, can be avoided or at least reduced.

It turned out that, for achieving particularly favorable operating parameters, the reflector layer possesses advantageously a porosity of at least 10%, preferably at least 20%, and/or advantageously a porosity of maximally 50%, preferably maximally 35%, the porosity being indicated according to the so-called Bruggemann model by the volume fraction of the pores or spaces not filled with the material of the reflector layer. By a porosity of 30%, according to this definition, one understands, therefore, a ratio of reflector layer material to air of 70:30.

In principle, the reflector layer can be manufactured using commercial materials, such as, for example, silver, chromium or the like. It turned out, however, that particularly favorable results can be achieved when the reflector layer is advantageously formed of aluminium (Al). Advantageously, the reflector layer is formed of crystallites of an average size of approximately 30 nm. Advantageously, the reflector layer has a thickness of 50 to 200 nm, preferably of 60 to 100 nm, particularly advantageously of approximately 80 nm. Advantageously, the reflector layer is designed in such a way that no significant voltage drop occurs upon switching on the respective electrode. For this purpose, the square resistance of the reflector layer is preferably less than approximately 1 $\Omega$.

The electrochromic electrode layer is advantageously formed of a suitably chosen electrochromic material, advantageously of molybdenum oxide, titanium oxide, vanadium oxide, niobium oxide, chromium oxide, manganese oxide, iron oxide, cobalt oxide, nickel oxide, rhodium oxide, tantalum oxide, iridium oxide and/or in a particularly advantageous development, of tungsten oxide, these materials being given in particular preferably as stoichiometric or almost stoichiometric compounds, as $MoO_3$, $TiO_2$, $V_2O_5$, $Nb_2O_5$, $Cr_2O_3$, $MnO_2$, $FeO_2$, $CoO_2$, $NiO_2$, $RhO_2$, $Ta_2O_5$, $IrO_2$, $WO_3$. Particularly favorable working parameters can be achieved when the electrochromic electrode layer has preferably a thickness of approximately 270 nm for $WO_3$.

The solid-state electrolyte layer is advantageously formed of zirconium oxide, silicon oxide, aluminium oxide, selenium oxide and/or preferably tantalum oxide. For the solid-state electrolyte layer, a thickness of approximately 200 nm is advantageously chosen. These materials are preferably also given as stoichiometric or almost stoichiometric compounds, as $ZrO_2$, $SiO_2$, $Al_2O_3$, $SnO_2$, and $Ta_2O_5$, respectively. For further increasing the achievable reflexion stroke, the ion storage layer on its part is in a particularly advantageous development formed as an electrochromic electrode, which also changes its transmission properties when a control voltage is applied. To form the electrochromic backplate electrode, the material chosen for manufacturing the ion storage layer is preferably iridium oxide, iridium-magnesium oxide, nickel oxide, nickel-magnesium oxide, manganese oxide, cobalt oxide, titanium-vanadium oxide and/or preferably iridium-tantalum oxide, the ion storage layer having advantageously a thickness of approximately 100 nm.

Suitably, the electrochromic element uses water as working medium. The application of a control voltage over the solid-state electrolyte layer, which is sufficiently charged with water as working medium, using the electrochromic electrode layer as cathode and the ion storage layer as anode, causes an at least partial electrolytic decomposition of the water contained in the solid-state electrolyte layer and/or the adjacent layers into protons on the one hand and hydroxide ions on the other hand. Through embedding of the protons generated in that process as guest ions into the electrochromic electrode layer, the latter changes, as described above, its spectral transmittance. Through embedding of the hydroxide ions into the ion storage layer formed as electrochromic backplate electrode, the ion storage layer also changes its spectral transmission properties, whereby the two mentioned coloring effects reinforce each other and thus cause a particularly high reflexion stroke. On the other hand, when the control voltage is disconnected and the electrodes are connected through an external resistance or a short circuit, or also when the control voltage is lowered or reverses its polarity, the embedded hydroxide ions will recombine with the protons under formation of water, so that the change of the transmittances will be cancelled.

Therefore, with the provided sequence of layers and with sufficient charging of the active layers with water as working medium, this process is reversible without requiring a re-feed of the working medium or an exchange of material with the environment. Consequently, the electrochromic element is particularly well suited for a so-called encapsulated embodiment, in which the multilayer system is completely or to a large extent enclosed by a casing, to protect it against undesired external influences. To provide such an encapsulated system, which is suited in particular for particularly long-lifetime embodiments, the multilayer system is advantageously provided with a sealing, which can be applied, for example, in the form of a further coating, for example a coat of lacquer. Alternatively or additionally, a layer of resin or the like, if necessary using a suitable adhesive for fixing it on the reflector layer, can be provided for sealing. Furthermore, alternatively or additionally, a further substrate, for example a glass, can be provided for covering the reflector layer.

The water provided as working medium can reliably be charged into the layer system by advantageously applying the electrochromic electrode layer on the side of the solid-state electrolyte layer facing away from the carrier and covering it, on its part, with the reflector layer. Consequently, the sequence of layers of the electrochromic element is in general: carrier-ion storage layer-transparent solid-state electrolyte layer-electrochromic electrode layer-reflector layer. For homogenizing the electrical contact to the ion storage layer, this contact is in a further or alternative advantageous embodiment a further electrode layer, preferably formed of indium-tin oxide (ITO) or Sb-doped tin oxide ($SnO_2$:Sb) or Al-doped tin oxide (ZnO:Al), immediately adjacent to the ion storage layer. This layer can be arranged in particular between carrier and ion storage layer. The dopings, if provided, are contained in a fraction of preferably up to 5%.

Advantageously, the electrochromic element is used in a motor-vehicle mirror.

Concerning the method for manufacturing the electrochromic element, the above-mentioned task is solved by applying the layers forming the multi-layer system on the transparent carrier, sequentially and in a suitably chosen succession, using a vacuum coating method. Advantageously, the coating method used is electron beam vaporization (EBV) or cathode sputtering.

To guarantee the intended porosity of the produced reflector layer, advantageously, the operating parameters of the chosen coating method are chosen in a suitable way. When depositing the reflector layer through electron beam vaporization, the layer is advantageously deposited at a relatively low coating rate of approximately 6-9 nm per minute. When depositing the reflector layer through cathode sputtering, this method is advantageously carried out in an inert-gas atmosphere at a system pressure of approximately 0.01 to 0.02 mbar.

To guarantee particularly favorable layer properties, in particular concerning the electrochromic electrode layer, the reflector layer is preferably applied without intermediate areation, immediately after application of the electrochromic electrode layer.

Especially in view of the intended porosity of the reflector layer, the active layers of the multilayer system can be charged relatively easily with the water provided as working medium, after the reflector layer has already been applied, storing in particular the produced multilayer system during a sufficiently long treatment time of, for example, four hours, in an atmosphere of sufficient humidity (for example 40% relative humidity). Afterwards, advantageously, a sealing is applied, so that the electrochromic element can be used as en encapsulated system.

The advantages achieved through the invention consist in particular in the fact that it is possible, on the one hand, by applying a sufficiently porous reflector layer on the electrochromic electrode layer, to obtain particularly good material properties of the electrochromic electrode layer—in particular without any intoxications worth mentioning—and, on the other hand, to embed the water provided as working medium in the multilayer system in a relatively simple and reliable way and over a large surface, even after the reflector layer has already been applied. The electrochromic element is, therefore, particularly well suited for embodiments of so-called encapsulated construction, in which a particularly good protection against undesired external influences or damage to the system can be achieved by means of a sealing and/or casing of the multilayer system. The reflexion stroke, i.e. the change of reflectance of a mirror provided with such an electrochromic element, achievable by applying the control voltage, due to the electrochromic phenomena, which can be achieved with the electrochromic element can be 5 or more times higher than that of comparable systems with dense reflector layer.

BRIEF DESCRIPTION OF THE DRAWINGS

One embodiment example of the invention is explained in more detail by means of a drawing in which the FIGURE shows a detail of a cross-sectional view of an electrochromic element.

DETAILED DESCRIPTION

The electrochromic element 1 according to the FIGURE is provided especially for application in a rear-view mirror of a motor-vehicle, but other suitable applications, such as, for example, in switchable windows, canopy tops or the like, are also possible. The electrochromic element 1 is executed in so-called solid-state construction and comprises a multilayer system 4 applied on a transparent carrier 2. In the embodiment example, a substrate of glass is provided as transparent carrier 2.

As the essential functional component for utilizing the phenomenon of electrochromism for a purposeful variation of its optical properties, the multilayer system 4 comprises an electrochromic electrode layer 6, formed of a suitably chosen electrochromic material, in the embodiment example, tungsten oxide ($WO_3$). Alternatively, the electrode layer 6 could also be formed of another suitable electrochromic material which changes its properties of optical transmission when a control voltage is applied. An ion storage layer 8 is associated to the electrochromic electrode layer 6 as a backplate electrode, said ion storage layer 8 also being formed of an electrochromic material, in the embodiment example, iridium-tantalum oxide, in fully oxidic or slightly suboxidic form, whereby the mass fractions (Ir:Ta) can be, for example, approximately 30:70. Alternatively, another suitable electrochromic material, such as, for example $IrO_2$, $NiO_2$, $MnO_2$, $CoO_2$, iridium-magnesium oxide, nickel-magnesium oxide and/or titanium-vanadium oxide, each of the latter in fully oxidic or slightly suboxidic form with the mass fractions Ir:Mg of, for example, 30:70, Ni:Mg of, for example, 50:50, and Ti:Va of, for example 40:60, can be provided for a development of the ion storage layer 8 as electrochromic backplate electrode. The electrochromic electrode layer 6 and the ion storage layer 8 comprise a transparent solid-state electrolyte layer 10 arranged between them, said solid-state electrolyte layer 10 being formed of tantalum oxide ($Ta_2O_5$) in the embodiment example. Alternatively, the solid-state electrolyte layer 10 could also be formed of another suitable material, such as, for example, $ZrO_2$, $SiO_2$, $Al_2O_3$ or $SnO_2$.

On its side facing away from the ion storage layer 8, the electrochromic electrode layer 6 is covered by a reflector layer 12. On its side facing away from electrochromic electrode layer 6, the ion storage layer 8 is connected with the carrier 2 by means of a further electrode layer 14 of indium-tin oxide (ITO) and an intermediate layer 16 of SiON.

Therefore, the electrochromic element 1 includes the sequence of layers: carrier 2-intermediate layer 16-electrode layer 14-ion storage layer 8-solid-state electrolyte layer 10-electrochromic electrode layer 6-reflector layer 12. In the embodiment example, the following layer thicknesses have been chosen: for the intermediate layer 16, approximately 50 nm, for the further electrode layer 14, approximately 200 nm, for the electrochromic electrode layer 6, approximately 270 nm, and for the porous reflector layer 12, approximately 80 nm.

The electrochromic element 1 is provided for use as anti-dazzle mirror whose reflection properties can be corrected when necessary. The succession of layers in the multilayer system 4 guarantees that a light beam to be reflected passes first of all through the carrier 2 and then through the intermediate layer 16, the further electrode layer 14, the ion storage layer 8, the solid-state electrolyte layer 10, and the electrochromic electrode layer 6, before being reflected on the reflector layer 12. Then, the reflected light beam passes through the before-mentioned layers in reverse order, before leaving the electrochromic element 1 through the carrier 2. In unswitched state, the multilayer system 4 is designed for a relatively high transmission, so that altogether, relatively high reflectances of, for example, approximately 70% can be achieved.

In case of need, i.e. if a dazzlement, for example of the driver through following vehicles, shall be avoided, the reflectance of the electrochromic element 1 can, however, be reduced by applying a control voltage between the electrochromic electrode layer 6 and the ion storage layer 8. For this purpose, the electrochromic electrode layer 6 is switched as cathode and the ion storage layer 8, as anode. Through the voltage applied, water, which is present in the electrochromic electrode layer 6, in the solid-state electrolyte layer 10 and/or in the ion storage layer 8 and which is provided as working medium, dissociates into protons and hydroxide ions, the protons accumulating in the electrochromic electrode layer 6 and the hydroxide ions, in the ion storage layer 8. This embedding of the respective ions causes a turbidity and possibly a change of color in the electrochromic electrode layer 6 and in the ion storage layer 8, so that the reflectance of the electrochromic element 1 is reduced. When the control voltage is disconnected, protons and hydroxide ions will recombine again into water, so that the original state and thus also the original reflectance of the electrochromic element 1 will be restored.

The electrochromic element 1 is designed for a particularly high so-called reflexion stroke, i.e. a particularly great change of the reflectance as a function of the control voltage applied. To achieve this, the reflector layer 12 is porous and possesses a porosity which is sufficient for the penetration of water or water vapour. In the embodiment example, the reflector layer 12 is formed of aluminium (Al), having a porosity of approximately 30%. The reflector layer is formed of crystallites of an average size of approximately 30 nm The multilayer system 4 is applied on the carrier 2 by thin-film technology through a vacuum coating method. Particularly suitable manufacturing methods to be used are electron beam vaporization or also cathode sputtering. In the embodiment example, the multilayer system 4 is applied by means of cathode sputtering.

In the manufacture of the electrochromic element 1, first of all, in suitable succession, the intermediate layer 16, the further electrode layer 14, the ion storage layer 8, the solid-state electrolyte layer 10, and the electrochromic electrode layer 6 are applied, these layers being applied sequentially and using suitable operating parameters for the cathode sputtering installation. The before-mentioned layers can be applied immediately one after another or also with intermediate storage in a dry atmosphere (relative humidity: 10%).

After the electrochromic electrode layer 6 has been applied, the reflector layer 12 is immediately applied by means of cathode sputtering, i.e. without intermediate aeration of the deposition installation. To guarantee the intended porosity of the generated reflector layer 12, this layer is deposited in an inert-gas atmosphere at a system pressure of approximately 0.01 to 0.02 mbar.

Due to the coating parameters chosen, the application of the reflector layer 12 affects the quality of the electrochromic electrode layer lying under it to an insignificant extent only. Furthermore, due to the chosen porosity of the reflector layer 12, a reliable impacting of the multilayer system 4 over a large surface with water provided as working medium can be effected in a particularly simple way, after application of the reflector layer 12. For this purpose, the coated carrier 2 is stored during a given storage time of approximately four hours in a humid atmosphere (relative humidity: approx. 40%). In this way, it is guaranteed that a sufficient quantity of water is embedded in the active layers of the multilayer system 4, to enable the above-mentioned processes utilized for electrochromism.

Due to the reversibility of the above-mentioned processes, the multilayer system 4 is particularly well suited for an encapsulated embodiment, in which a re-feed of the working medium or another medium is provided. Accordingly, the electrochromic element 1 is executed in such an encapsulated manner, the reflector layer 12 being covered first of all with an adhesive layer or an adhesion-promoting layer 18 and then with a suitable sealing 20.

What is claimed is:

1. A method for manufacturing an electrochromic element, comprising:

applying a multilayer system onto a carrier by vacuum coating, the multilayer system including an ion storage layer, a solid-state electrolyte layer, an electrochromic electrode layer, and a reflector layer, wherein the applying of the multilayer system includes applying the reflector layer in an inert-gas atmosphere at a system pressure of approximately 0.01 to 0.02 mbar.

2. The method as recited in claim 1, wherein the applying of the multilayer system includes applying the reflector layer without intermediate aeration and immediately after the applying of the electrochromic electrode layer.

3. The method as recited in claim 1, further comprising, after applying of the multilayer system onto the carrier, charging at least one of the ion storage layer, the solid-state electrolyte layer, and the electrochromic electrode layer with water and subsequently, applying a sealing.

* * * * *